Dec. 8, 1964    E. L. SISSON    3,160,239
MACHINE BRAKE
Filed Nov. 28, 1962    2 Sheets-Sheet 1
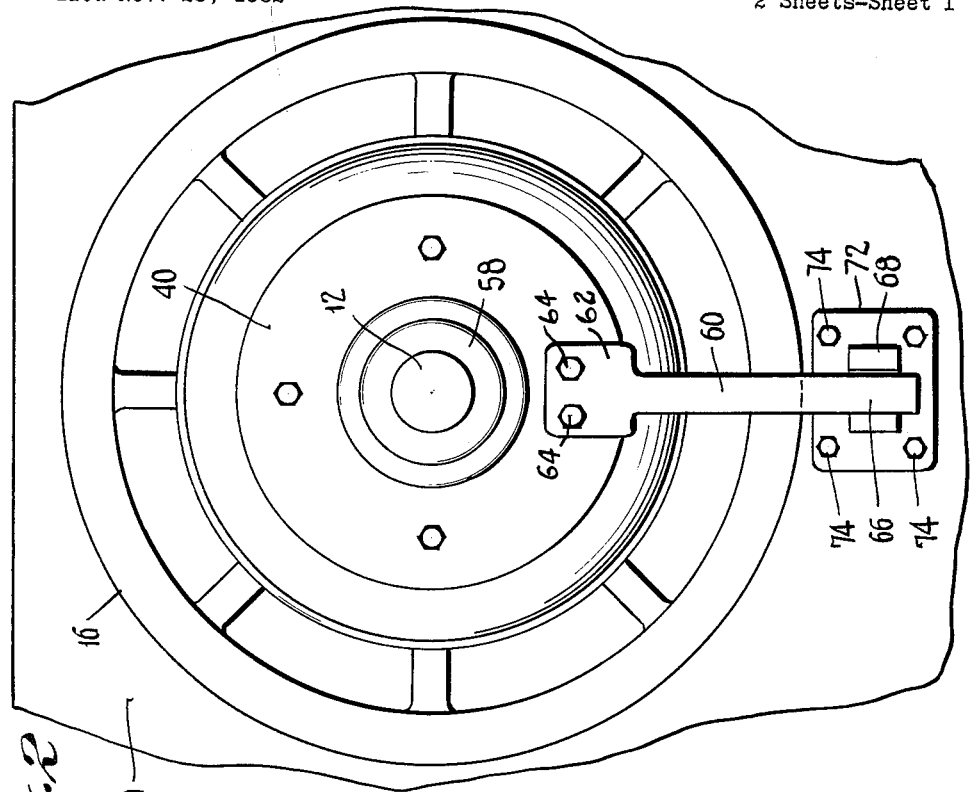
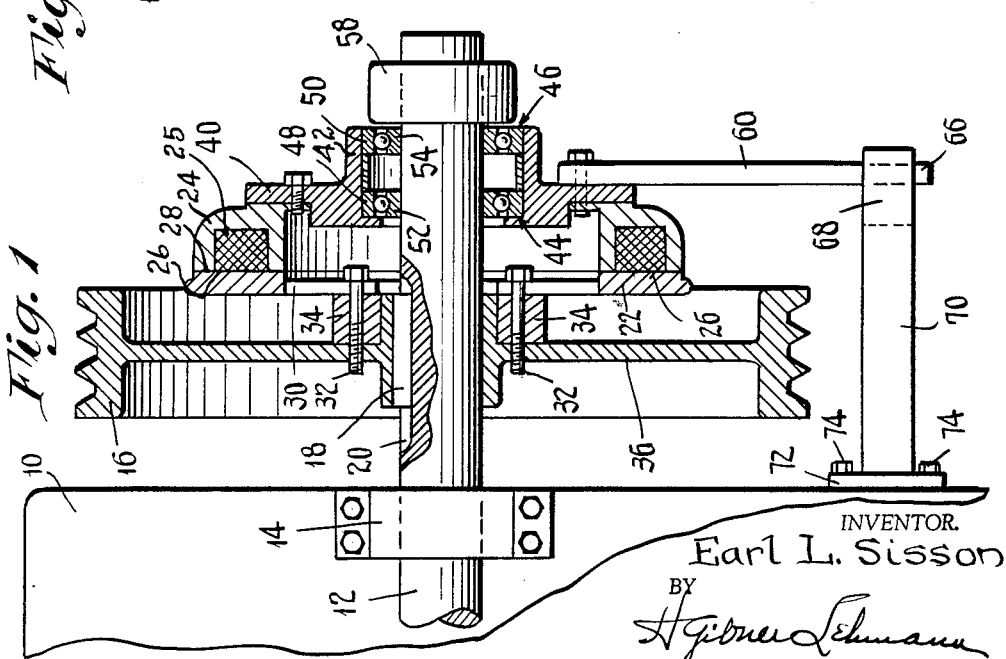
INVENTOR.
Earl L. Sisson
BY
H. Gibner Lehmann
AGENT

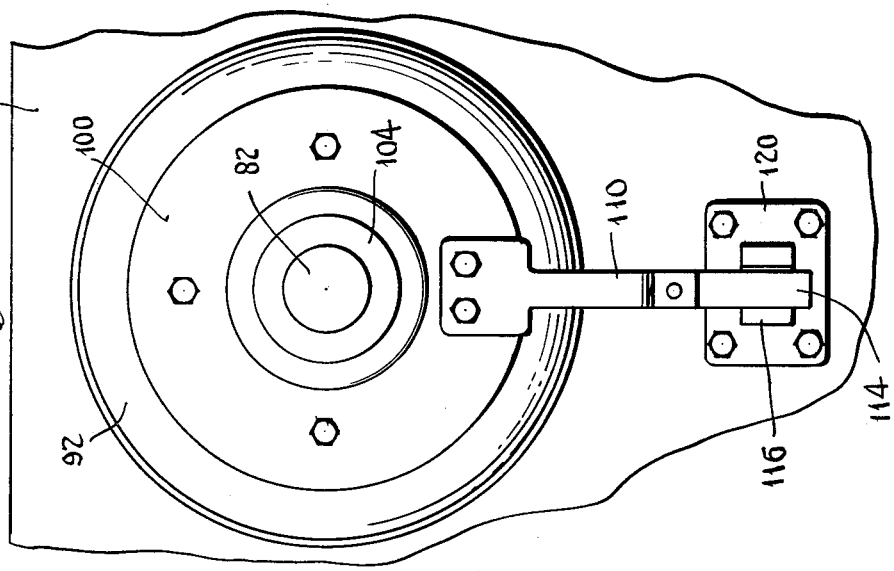
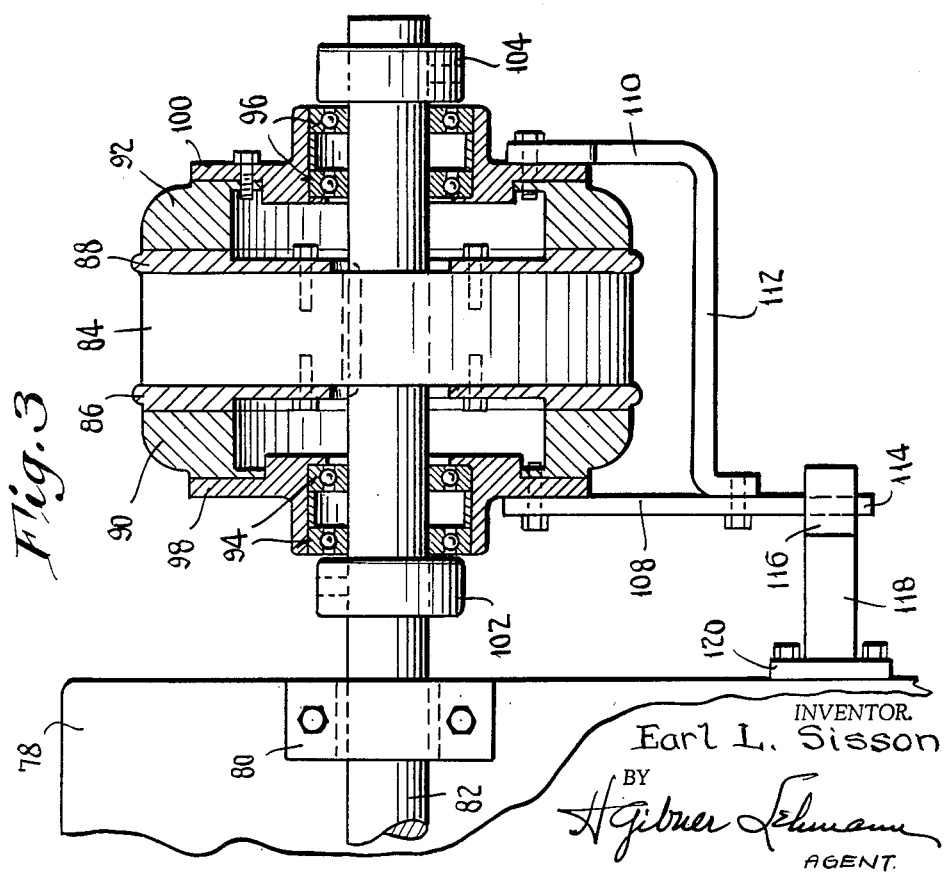

United States Patent Office 3,160,239
Patented Dec. 8, 1964

3,160,239
MACHINE BRAKE
Earl L. Sisson, Stratford, Conn., assignor to Clark Metal Products, Inc., Fairfield, Conn., a corporation of Connecticut
Filed Nov. 28, 1962, Ser. No. 240,545
8 Claims. (Cl. 188—161)

This invention relates to brakes for rotating production machinery, and more particularly to friction-type rapid-halt braking mechanisms intended for this purpose.

The invention is illustrated in connection with electric (magnetic) brake devices. However, no limitation is to be attributed to such specific showing, since the invention has utility when applied to other brakes of the kind which involve turnable and stationary, cooperable or co-engaging parts.

Electric braking devices for production-type machines are commonly of the kind having cooperable field or coil and armature structures constituting two juxtaposed, co-engaging salient components of the brake, one of which rotates with a turnable part of the machine (such as the shaft) whereas the other is stationarily mounted or anchored on the machine frame. The said components have friction faces which forcibly engage each other as the braking action occurs, whereby the stationary coil structure imposes a powerful restraint on the turning armature, quickly bringing the latter and the turning machine parts to a halt.

Heretofore, in such electric brakes the coil structure was bolted to a stationary machine part such as the machine frame, there being a requirement that certain relatively "tight" tolerances and a high degree of concentricity be maintained.

This requirement imposed a burden in connection with the installation, since it not only involved a high cost but also sometimes resulted in faulty or unsatisfactory operation.

As is well known, frames of production machinery are usually cast of metal and have rough exterior surfaces. To accurately mount a brake part on such an uneven and untrue surface requires costly machining operations and excessive installation time, to say nothing of the chance of improper operation occuring if finally the accuracy of the installation does not fulfill the specified exacting requirements.

The above drawbacks and disadvantages of prior electric and other braking devices for production machines are obviated by the present invention, and one object of the invention is to provide a novel and improved machine brake device of the type having turning and stationary cooperable components, wherein no exacting requirements are involved in the mounting of the stationary brake part on the machine frame but instead the mounting of such brake part may be easily and quickly effected with but little if any machining operations.

Another object of the invention is to provide an improved machine brake construction in accordance with the foregoing, which is readily adaptable for use with either single pairs of braking elements or else multiple pairs, all without involving complicated or costly installation procedure.

A further object of the invention is to provide an improved machine brake device as above set forth, which is characterized by precise and accurate alignment and concentricity of the cooperable braking components while enabling relatively easy and quick installation of the brake to be had with but few, non-critical machining procedures.

A feature of the invention resides in the provision of an improved brake device as characterized, wherein appreciably large braking forces may be readily handled with relatively simple anchorage means which are connected with the stationary brake component.

Still another object of the invention is to provide a novel and improved mounting and anchorage device for the stationary component of an electric or equivalent brake device, by which such stationary component may be quickly, accurately secured to the machine in operative position.

A further feature of the invention resides in the provision of a novel brake device as above set forth, wherein relatively few components are required, such components being readily available on the market or else easily produced with conventional machine equipment.

Other features and advantages will hereinafter appear.

In the drawings accompanying this specification, similar characters of reference are used to designate like components throughout the several views, in which:

FIGURE 1 is an axial sectional view of an improved electric brake device for machines and the like, as provided by the invention.

FIG. 2 is a front elevational view of the brake device shown in FIG. 1.

FIG. 3 is an axial sectional view similar to that of FIG. 1, but showing a multiple-unit electric brake device made in accordance with the invention.

FIG. 4 is a front elevational view of the multiple unit brake device illustrated in FIG. 3.

Referring first to FIGS. 1 and 2, the machine tool or production machine is shown as comprising a frame 10 having a turnable or rotating part 12 in the form of a drive shaft, the said shaft being carried in a bearing 14 and mounting a drive pulley and flywheel 16. The flywheel 16 is secured to the shaft 12 in the usual manner, being keyed thereto by a spline or key 18 carried in a longitudinal groove 20 of the shaft.

In accordance with the present invention, in conjunction with the rotating machine part or drive shaft 12 there is provided an improved braking organization comprising two salient components and a novel mounting or securing means associated with one of the components. The brake device itself comprises essentially a rotating component 22 and a stationary component 24. The rotating component 22 has a friction face 26 which is cooperable or engageable with an adjoining friction face 28 of the stationary component 24.

Where the braking device comprises an electric or magnetic brake, the turning component 22 is constituted as a magnetic armature member and the stationary component 24 is constituted as a coil or field structure, including a coil 25. The exact construction and details of such armature and field structures are not given herein, since they are well known in the art, and since they comprise conventional components readily available on the market.

The turnable or armature part 22 is secured to the drive shaft 12 of the machine to turn therewith. Such securement may make use of the flywheel and pulley member 16, as shown. The armature 22 may have a circular mounting plate or disk 30 apertured to receive mounting screws 32 which pass through bushings or spacers 34 and are threaded into the disk or plate portion 36 of the pulley.

With such construction, the armature member 22 may be quickly, accurately mounted for turning in a path or zone which is truly concentric with the shaft 12, the armature easily having a degree of accuracy in its positioning which is substantially as precise as the accuracy of the flywheel 16 itself. In place of the bushings 34, an annular or ring may be used, having through holes to accommodate the mounting screws 32.

In accordance with the present invention, a novel and improved means is provided by which the stationary coil structure part or component 24 of the electric brake may be easily and quickly, accurately mounted in cooperable relationship with the armature component 22, all without the necessity of resorting to expensive or time-consuming machining operations involving the machine frame 10. Instead, the coil structure 24 of the electric brake, by the use of simple means as provided by the invention, may be quickly, accurately positioned for engagement with the turnable armature component 22 and may be sturdily secured against rotation whereby it will have the maximum effectiveness in quickly halting the pulley 16 and the drive shaft 12.

The improved mounting means for the coil structure 24 of the electric brake comprises a turnable bearing means, preferably an anti-friction bearing means, arranged to engage and preferably to be carried by the machine shaft 12, said bearing means also preferably being of a type readily available on the market as distinguished from one which is especially made for this particular purpose and no other.

As shown in FIG. 1, the stationary coil structure 24, 25 is carried by a mounting ring 40 provided with a hub 42 in which are carried conventional multi-part anti-friction bearing assemblages 44 and 46. The said bearing assemblages have outer race members 48 and 50 respectively, which are rigidly affixed to the ring 40, and inner race members 52 and 54 respectively, the latter two race members being engaged with and slidably carried by the drive shaft 12 of the machine. By the provision of such anti-friction bearing assemblages in conjunction with the mounting disk 40, the coil structure 24 of the electric brake may be very accurately positioned adjacent and with respect to the turning armature part 22, and such positioning may be most easily and quickly effected, as by merely slipping the coil structure and the anti-friction bearing mounting means therefor onto the drive shaft 12. This specific operation obviously requires no machining whatsoever of the machine frame 10, as will be readily understood. After the coil structure 24 is put in place in the above manner, a retaining collar 58 may be applied to the shaft 12 and secured in place, as by a conventional set screw.

Also, in accordance with the invention, the assemblage comprising the coil structure 24 of the electric brake is connected with the machine frame 12 in a simple and effective manner through improved anchorage means in the form of a multi-part coupling which may have loose parts or parts which are capable of occupying different relative positions without being de-coupled, such connection again dispensing with critical or costly machine operations which were heretofore required on the machine frame. The anchorage or coupling means as provided by the invention comprises a radially extending anchorage arm 60 having an enlarged mounting portion 62 provided with through holes to accommodate bolts 64 which are threaded into the mounting disk 40 of the coil assemblage. The radially extending anchorage arm 60 has at its other extremity a lug 66 disposed in a bifurcated end or fork portion 68 of an anchorage bracket 70 provided with a base portion 72 which is secured to the machine frame 10 by screws 74.

As seen in FIG. 2, a certain amount of play or clearance exists between the fork 68 of the bracket 70 and the anchorage arm 60, thereby to avoid any interference with the precise mounting of the coil structure 24 as effected by the anti-friction bearing assemblages 44, 46. Moreover, by the provision of such clearance space between the anchorage arm 60 and the fork 68 of the bracket 70 it is not necessary to effect a precisely accurate mounting of the bracket 70 on the machine frame 10. Instead, such bracket may be carried by a fairly uneven exterior surface of the machine frame, or a surface which has been only roughly machined to a somewhat smooth finish, as distinguished from an accurately finished and squared, milled or ground surface.

I have found that by the provision of the said anchorage means comprising the anchor arm 60 and bracket 70, by which there is avoided the necessity for extensive or accurate machining of the machine frame 10, an extremely practical and highly efficient mounting of the coil structure 24 of the brake, in conjunction with the anti-friction bearing assemblages carried by the shaft 12 of the machine, is had.

With the above construction, the coil structure 24 of the brake is held stationary during the turning of the drive shaft 12 of the machine, and such coil structure is accurately positioned and completely cooperable with the turning armature 22 of the brake. This effective mounting of the coil structure component 24 of the brake is quickly and easily effected, as already pointed out above, and provides for the maximum effectiveness in the braking action. Moreover, the anchorage arm 60 and anchorage bracket 70 may be constructed to appreciably exceed the desired or required minimum strength, whereby in conjunction with the machine shaft 12 the forces involved in halting the said shaft may be readily withstood without danger of failure of the brake.

Upon energization of the coil structure 24, a strong magnetic attraction will be established between such structure and the armature 22 whereby the friction surfaces 26 and 28 of the brake components will be forcibly brought together, imposing a restraint on the armature 22 which quickly brings it to a halt.

The brake structure as above set forth is seen to involve relatively few components, some of which are readily available on the market whereas others may be easily fabricated without involving critical tolerances or dimensions. Notwithstanding the economy and ease of installation, the main braking components comprising the armature 22 and coil structure 24 will at all times be accurately positioned with respect to each other.

Another embodiment of the invention is illustrated in FIGS. 3 and 4, wherein multiple braking units are provided and arranged for easy and quick installation on the machine whose turning part is to be halted. In these figures the machine frame is indicated at 78, such frame having a bearing 80 in which there is carried a turnable part or drive shaft 82. On the drive shaft 82 there is splined an armature mounting disk 84 carrying armature elements or components 86 and 88 respectively at its opposite sides.

Cooperable with the armatures 86 and 88 are magnetic coil structures 90 and 92 respectively, the said coil structures being turnably mounted on the shaft 82 by means of anti-friction bearing assemblages 94 and 96 respectively. Mounting plates or disks 98 and 100 effect the mounting of the coil structures 90 and 92 respectively, in a manner similar to that already described in connection with FIGS. 1 and 2.

The drive shaft 82 has collars 102 and 104 which are engageable with the bearing assemblages 94, 96 respectively, thereby preventing axial movement of the coil structures 90, 92 respectively to the left and to the right as viewed in FIG. 3.

The coil structures 90 and 92 are provided with anchorage arms 108, 110 respectively, such arms being secured together by a bridging or yoke portion 112 of the arm 110. The outer extremity 114 of the anchorage arm 108 is received in a fork 116 of an anchorage bracket 118 secured by means of a base portion 120 to the machine frame 78.

The operation of the multiple electric brake unit illustrated in FIGS. 3 and 4 is similar to that already described in connection with FIG. 1.

As with the construction of FIGS. 1 and 2, the coil structures 90, 92 of the brakes are easily and quickly installed and carried by the shaft 82, by merely slipping the bearing assemblages in place on the shaft, together with the restraining collars 102 and 104. The anchorage arms 108, 110 are restrained from turning by the anchorage bracket 118 which need not be precisely positioned by instead is secured to the machine frame 28 with a minimum of machining operations.

It will be understood that accurate concentricity and positioning of the coil components 90, 92 with respect to the armature components 86, 88 is effected with the above construction, and the advantages explained in connection with FIGS. 1 and 2 are equally present in the construction of FIGS. 3 and 4.

Variations and modifications may be made within the scope of the claims, and portions of the improvement may be used without others.

I claim:

1. A machine brake mechanism comprising, in combination:
   (a) an annular electric brake armature,
   (b) means for attaching said armature to a rotating machine part which is to be halted, to turn therewith,
   (c) an annular electric braking coil structure cooperable with the armature to impose braking forces thereon,
   (d) multi-part bearing means for mounting the coil structure on said rotating machine part and in accurate operative aligned position with the armature, said bearing means being organized to enable the coil structure to remain stationary while the rotating part turns,
   (e) a multi-part coupling means having parts capable of normally occupying different relative positions without being de-coupled, one of said parts being rigid with the coil structure and the other being arranged for engagement with a stationary machine part, to prevent turning of the coil structure at all times,
   (f) all parts of said bearing means being independent of and non-rigid with the said other coupling part which is engageable with the said stationary machine part.

2. A mechanism as in claim 1, wherein:
   (a) the said one part of the coupling means comprises an arm extending radially from the coil structure, said coupling means including a fork and a lug loosely received in the said fork, said other coupling part having mounting means for attachment to the said stationary machine part and said fork and lug being on the said coupling parts.

3. A mechanism as in claim 1, wherein:
   (a) the bearing means comprises an anti-friction bearing assemblage having inner and outer races comprising the parts of the bearing means, the outer race being affixed to the coil structure.

4. A mechanism as in claim 3, wherein:
   (a) there is provided a machine shaft constituting the said rotating machine part,
   (b) the inner race of the bearing assemblage comprises a collar adapted to be slidably carried by the machine shaft, and
   (c) there is a collar attached to the machine shaft, for limiting endwise movement of the inner race in one direction.

5. A mechanism as in claim 1, wherein there is:
   (a) a second brake armature affixed to the first-mentioned armature,
   (b) a second annular electric braking coil structure cooperable with the second armature, to impose braking forces thereon,
   (c) a second bearing means for mounting the second coil structure on said rotating machine part and in operative accurately aligned position with the second armature, said second bearing means being organized to enable the second coil structure to remain stationary while the rotating part turns, and
   (d) means rigidly connecting said second coil structure to said first-mentioned one coupling part.

6. A mechanism as in claim 5, wherein:
   (a) both the said bearing means comprise anti-friction bearing assemblages having inner and outer races, the outer races being affixed respectively to the said coil structures,
   (b) machine shaft is provided, constituting the rotating machine part,
   (c) the inner races of the bearing assemblages comprise collars slidably carried by the machine shaft, and
   (d) collars are provided for attachment to the machine shaft, for limiting endwise movement of the inner races each in one direction.

7. A mechanism as in claim 1, and further comprising:
   (a) a power-driven machine having a frame to which the said other coupling part is fastened, and having on said frame a shaft constituting the said rotating machine part.

8. A mechanism as in claim 7, and further including:
   (a) a drive pulley part disposed between the machine frame and the brake armature, the latter being rigidly attached to the pulley.

References Cited in the file of this patent

UNITED STATES PATENTS 2,886,149   Baermann _____ May 12, 1959